Inventor:
KLAUS BECKER-EHMCK.
ATTORNEY.

United States Patent Office 3,376,777
Patented Apr. 9, 1968

3,376,777
KETTLEDRUM
Klaus Becker-Ehmck, am Kirchenholzl 4,
Grafelfing, near Munich, Germany
Filed Oct. 17, 1966, Ser. No. 587,239
Claims priority, application Germany, Apr. 14, 1966,
St 1,988
5 Claims. (Cl. 84—419)

ABSTRACT OF THE DISCLOSURE

The kettle of the drum has a threaded connection onto a vertical screw. A supporting member is rotatably mounted to said screw at a fixed vertical level. Levers extend from the supporting member through the wall of the kettle and are connected to the drum head. Rotation of the kettle about its vertical axis results in a movement of the kettle relative to the supporting member. This movement is transmitted to the levers at their passage through the kettle and thence to the drum head.

Field of the invention

The invention concerns a kettledrum, in which the tensioning of the drumhead secured to a tension ring is effected centrally by means of a tensioning device located mainly in the interior of the kettle, and having a rotatable screw spindle passed through a central aperture of the kettle bottom.

Summary of the invention

The kettledrum improved in accordance with the present invention differs from known embodiments of this kind by a supporting member mounted on the upper end of the screw spindle, to which supporting member radially extending tension levers uniformly spread over the circumference are fastened, and supported in holes formed in the kettle wall through which they pass, the outer ends of the levers being detachably connected by means of adjustable turnbuckles with a tension ring mounted on the rim of the drumhead.

Description of the prior art

The said construction is a simple, cheap tension device, yet capable of exerting considerable tension force. Hitherto it was necessary for this purpose to have a structurally complex, costly and heavy tensioning mechanism, the application of which remained limited to large concert kettledrums. The invention permits the production of small kettledrums used as instructional instruments for schools, with a central tensioning system which is readily and rapidly manipulated by school-children.

Brief description of the drawing

The features of the invention will now be described with reference to the accompanying drawings, in which.

Description of the preferred embodiments

Figure 1:
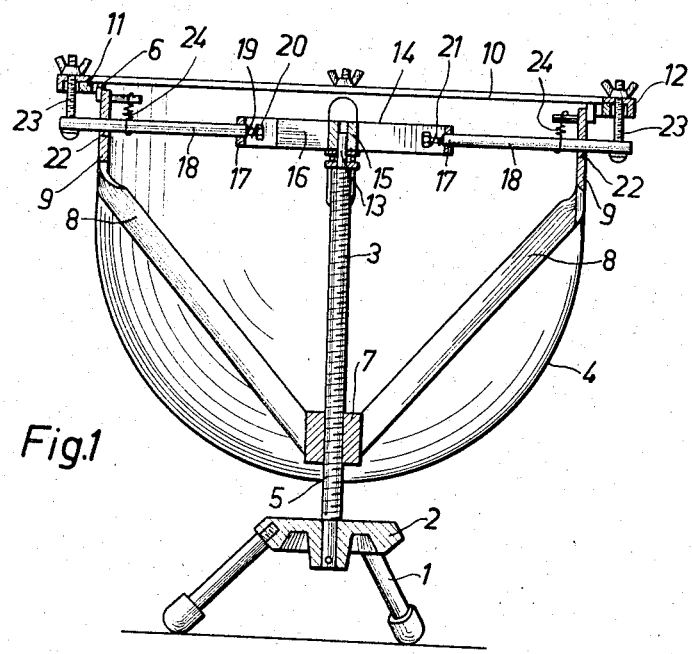
FIG. 1 shows a kettledrum in sectional elevation along the line I—I in FIG. 2.
Figure 2:
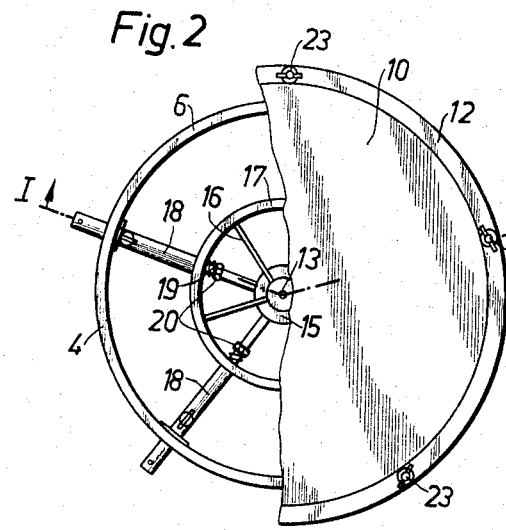
FIG. 2 shows a kettledrum in plan view, broken open on the left.

Referring to FIGS. 1 and 2, a plate 2 of a tripod foot 1 has a screw spindle 3 secured thereto, about which the kettle 4 of the drum is rotatable by means of a screw boss 7, on the spokes 8 of which the kettle 4 is secured, freely suspended, and having a central aperture 5 in the bottom for the passage of the spindle 3. This ensures a substantially undamped freedom of vibration of the kettle and hence a considerable strength of sound of the kettledrum, the character of which can be influenced by varying the diameter of the aperture 5.

The drumhead 10 is fastened to the ring 11 and is tensioned over face edge 6 of the kettle 4 by means of a tensioning device which is formed from a supporting member 14 having the appearance of a spoked wheel with boss 15, spoke arms 16 and rings 17. The member is mounted rotatably by means of ball bearings on the upper end of the spindle 3 stepped to form a pivot pin 13. The rim 17 carries tension rods 18 spaced uniformly round its circumference, the rods being so mounted relative to the rim 17 that they have both axial and radial clearance. This is attained by inserting the reduced-diameter ends 19 of the tension levers 18 in correspondingly larger holes of the rim 17, the rods being retained displaceably therein by means of the nuts 20. Helical compression springs 21 ensure that the tension levers 18 are resiliently held in the positions shown.

The radially extending tension levers 18 are passed with clearance through holes 22 in the wall of the kettle 4, and press against the tops of the holes. Their outer ends projecting from the wall of the kettle 4 are connected by means of turnbuckles 23 with the tension ring 12 mounted on the ring 11, so that they not only transmit the tension force from the central adjustment, but they also permit the drumhead 10 to be uniformly tensioned by rotation of the nuts of the turnbuckles 23, thus taking up any variations of stretch which in the case of hides of animal origin result from their irregular structure.

The overall tensioning of the drumhead 10 is effected by rotating the kettle 4 on the spindle 3 about the base 1. The kettle 4 is moved vertically downwards by the boss 7, so that the tension levers 18 pivot about their bearing points on the rim 17. The outer ends of the tension levers 18 move through a greater downward distance than the kettle, so that relative movement between the ring 11 and the face edge 6 of the kettle 4 occurs, causing the drumhead 10 to be tensioned. The magnitude of the tension force produced is dependent upon the pitch and diameter of the screw spindle 3 and the kettle diameter to which the turning force is manually applied, in conjunction with the ratio of the leverage of the rods 18. As is evident from the drawing, a small manual force acting on the kettle causes considerable drumhead tension forces to be exerted, so that the tensioning procedure may readily be performed by school-children.

It is necessary for the thin kettle wall to be adequately strengthened in the region of the holes 22 so as to prevent deformation of the kettle wall by the compressive forces introduced at this point by the levers 18. Hence this region of the kettle wall is reinforced by the aid of head portions 9 of the spokes 8, connecting the kettle 4 with the screw boss 6. The number of levers 18 is made equal to the number of spokes 8.

To prevent undesired resonance vibrations of the tension device during playing the kettledrum, the levers 18 are held in position in their holes by means of tension springs 24.

Figure 3:
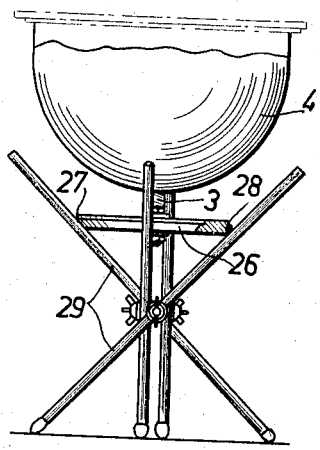
FIG. 3 shows the same kettledrum with an alternative foot design.

A kettledrum in accordance with the invention may be constructed, as shown in FIG. 3, so that it can be supported on a collapsible cross stand. Here it is fitted with a thick cruciform base 26 preferably made of wood, in which the spindle 3 is centrally secured. To make the drum sit firmly in the cross stand, this base plate 26, as shown on the left of FIG. 3, has an edge 27 bevelled conically to the inclination of the foot rods 29 or, as shown on the right of FIG. 3, a rubber ring 28 of circular cross-section is inserted in the edge. The edge 27 may be also be lined with rubber. This base not only permits the kettle to be twisted relative to the cross stand for tensioning the drumhead, but it may also allow the drum to be tiled, which is of advanage for playing whilst seated. In place of the rubber ring in the edge of the base 26 a suitable friction covering may be applied to the foot rods 29 of the cross stand 25; this covering may comprise rubber webs let into the rods 29 or rubber or plastics material tube lengths slipped over the rods 29.

I claim:

1. In a kettle drum, a tensioning device comprising a base, a screw fixed thereto and passing coaxially into the kettle of said drum, a screwed boss on said screw, spokes fastened to said boss at one end and to the interior of the rim of said kettle at the other end, a supporting member rotatable about the axis of said screw and carried by said screw inside said kettle, tension levers extending radially from pivotal support in said supporting member through holes in the rim of said kettle, a tension ring located on the rim of said kettle, a drum-head fastened to said tension ring, and coupling means between said ring and the outer ends of said tension rods.

2. The tensioning device as recited in claim 1, said coupling means being turnbuckles detachably coupling said tension ring with said rods.

3. The tensioning device as recited in claim 1 and comprising feet attached to said base, whereby said kettle drum may be stood on a floor.

4. The tensioning device as recited in claim 1, having a base formed as a thick plate, and friction means applied to the edge of said plate whereby said kettle drum may be stood on a cross stand.

5. The tensioning device as recited in claim 1 in which said supporting member is in the form of a spoked wheel, further comprising a bearing between the centre of said wheel and said screw, a plurality of tension levers in the form of rods extending radially from said supporting member, pivot points for said rods at said supporting member and at the rim of said kettle, a tension spring between each rod and said kettle rim, and a compression spring between each rod and said supporting member.

References Cited

UNITED STATES PATENTS 2,259,268  10/1941  Robison _____ 84—419
2,586,476  2/1952   Murbach _____ 84—419

FOREIGN PATENTS 831,942   2/1952   Germany.
851,452   10/1952  Germany.

RICHARD B. WILKINSON, *Primary Examiner.*

CHARLES OVERBEY, *Assistant Examiner.*